Figure 1:
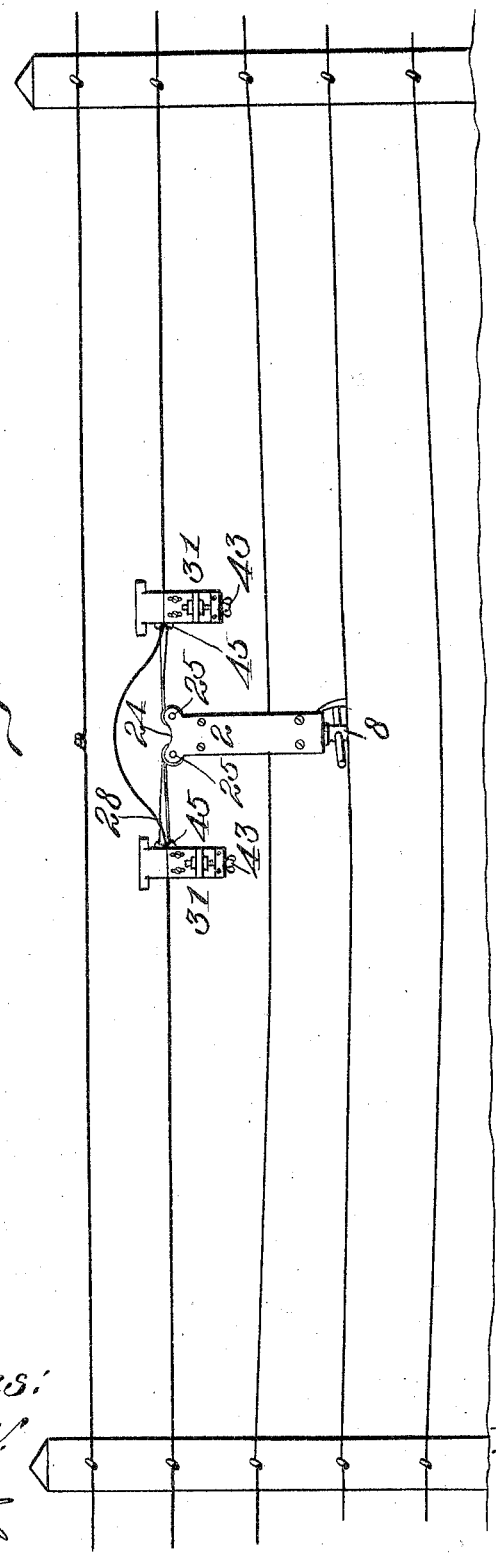

No. 776,512. PATENTED DEC. 6, 1904.
B. HENRY.
WIRE TIGHTENER.
APPLICATION FILED MAR. 9, 1904.
NO MODEL. 2 SHEETS—SHEET 1.

Witnesses:
Inventor
Bush Henry
By
Atty

No. 776,512. PATENTED DEC. 6, 1904.
B. HENRY.
WIRE TIGHTENER.
APPLICATION FILED MAR. 9, 1904.
NO MODEL. 2 SHEETS—SHEET 2.
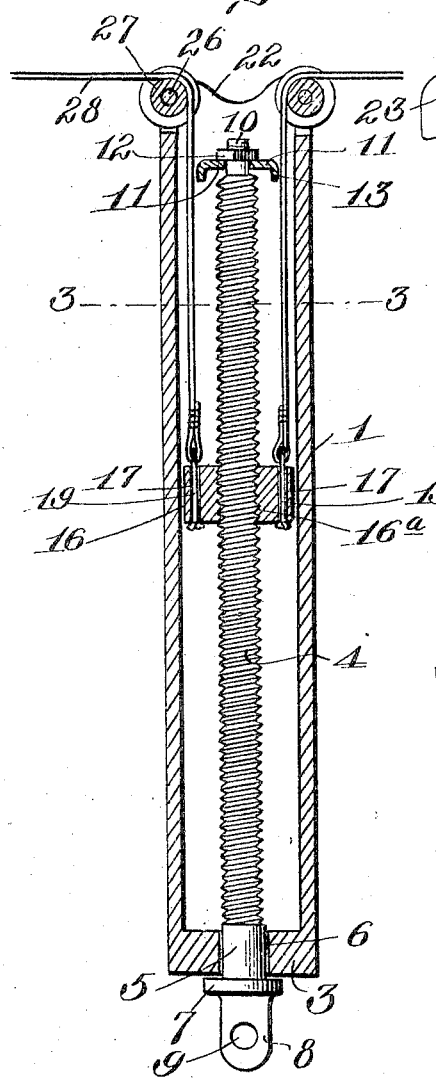
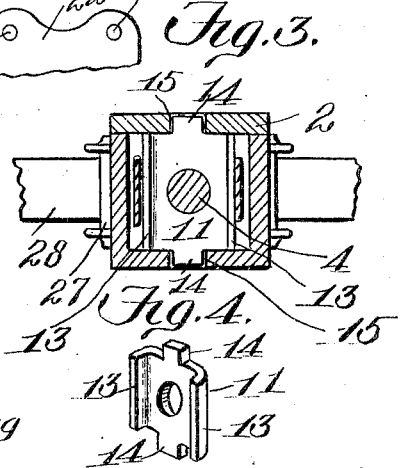
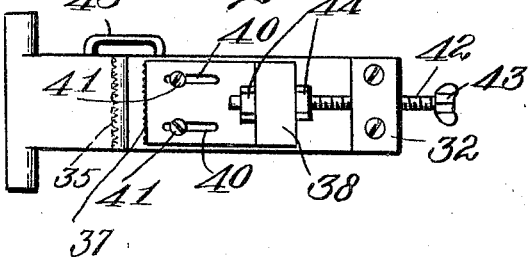
Witnesses:
Inventor
Bush Henry No. 776,512.

Patented December 6, 1904.

UNITED STATES PATENT OFFICE.

BUSH HENRY, OF EDEN, TEXAS.

WIRE-TIGHTENER.

SPECIFICATION forming part of Letters Patent No. 776,512, dated December 6, 1904.

Application filed March 9, 1904. Serial No. 197,238. (No model.)

*To all whom it may concern:*

Be it known that I, BUSH HENRY, a citizen of the United States, residing at Eden, in the county of Concho and State of Texas, have invented new and useful Improvements in Wire-Tighteners, of which the following is a specification.

This invention relates to wire-tighteners, and is more particularly designed for tightening and stretching fence-wires and the like, and has for its object to provide an improved device of the character referred to, which will be extremely simple, inexpensive, and durable in construction and effective in operation, and which may be applied and operated with ease and despatch. It also has for its object to provide an improved wire-clamp to be used in connection with the tighteners for grasping and holding the end of the wire to be tightened and stretched.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a view illustrating the manner of using my improved tightener. Fig. 2 is a longitudinal sectional view of the tightener. Fig. 3 is a transverse sectional view taken on the line 3 3 of Fig. 2. Fig. 4 is a detail perspective view of the bearing-plate. Fig. 5 is a sectional view of one of the clamps, and Fig. 6 is a top plan view of the same. Fig. 7 is a detail view of a portion of the casing.

Referring to the drawings, the numeral 1 indicates an oblong casing rectangular in cross-section and provided with a removable cover 2, which may be attached to the casing by bolts or other preferred manner. The casing is closed at one end by a head 3 and is open at its other end. Disposed centrally and longitudinally in said casing is a screw 4, said screw having an unthreaded portion 5, which passes through a perforation 6 in the head 3, and on the outer side of the head 3 said screw is provided with a collar 7 and with an extension 8, having formed therein an eye or perforation 9. The opposite end of the screw is provided with an unthreaded portion 10, which passes through a bearing 11 and has fixed on its extreme end a nut 12, which prevents the withdrawal of the screw from its bearing. The bearing 11 consists of a metallic plate provided at its opposite sides with inwardly-turned flanges or rounded edges 13 and has formed on its top and bottom projections or extensions 14, which project through apertures 15, formed in the top and bottom of the casing 1, whereby when the cover or top 2 is secured to the casing—as, for example, by screws or bolts—the said bearing-plate will be rigidly held in place against movement.

Disposed in the casing 1 is a nut 16, which, preferably, is nearly of the same area in cross-section as the cross-sectional area of the casing, and the screw 4 passes through a threaded perforation $16^a$, formed centrally in said nut. Formed in the nut are perforations 17, one of said perforations being disposed on one side of the threaded perforation $16^a$ and one on the opposite side thereof, and passing through each pair of said perforations is a staple 19, the ends of which are upset against the back of the nut to secure the staples in place. The fixed side of the casing at its open end is provided with an extension 22, in which are formed perforations 23, and the removable top 2 of the casing is provided with a similar extension 24, having perforations 25, the perforations 23 and 25 registering with one another for a purpose which will now be made apparent.

Journaled in the perforations 23 and 25 are two spindles 26, which pass through pulleys 27, said pulleys being arranged on opposite sides of the longitudinal axis of the screw 4, the pulleys being preferably loosely mounted on the spindles. Attached to each of the staples 19 is a strap or chain 28, which may be formed of any suitable or preferred material, one end of each of the straps being attached to one of the staples 19, and the other ends of the straps are adapted to be attached to clamps constructed in the manner hereinafter to be described. Each of the clamps is constructed as follows: A base or body portion 31 is provided at one end with a threaded bearing 32 and at its other end with a fixed or stationary jaw 33, having formed on its inner edge an overhanging flange or lip 34. The inner end of the fixed jaw 33 is serrated, as at 35. Arranged on the base or body portion 31 of the clamp is an endwise-movable jaw 36, serrated at one end, as at 37, and provided at its other end with an upturned flange 38, having formed therein a perforation 39. A movable jaw 36 is provided with two longitudinal slots 40, through which project headed screws or bolts 41, which are fixed in the base or body portion 30, said screws or bolts serving as guides to guide the movable jaw in its endwise movement and also to hold the jaw in place on the base or body portion of the clamp. Passing through the threaded bearing 32 is a thumb-screw 42, provided at one end with a flattened head 43 for turning the screw. The screw loosely passes through the unthreaded perforation of the flange 38 of the movable jaw, and said screw has fixed on opposite sides of said flange nuts 44, which prevent the flange from having any movement independent of the screw. Formed on or attached to one side of the body portion 31 of each of the clamps is a loop or staple 45, to which the corresponding end of the chain or strap 28 is attached.

In practice the two clamps are caused to grasp the wire strand to be tightened at suitable distances apart. Then by turning the screw 4 in the proper direction the nut 16 is withdrawn within the casing, drawing in with it the two straps 28, whereby the fence-strand is drawn taut. The slack that results between the two clamps after the latter have been drawn toward each other may be twisted, or the slack portion of the wire may be cut and fastened together, after which the clamps may be released and the apparatus be employed to tauten up another fence-strand or section of fence-strand.

I have shown and described the bearing-plate 11 as being provided with inwardly-rounded edges or flanges 13, the purpose of which is to prevent the edges of the bearing-plate from wearing or breaking the straps or chains 28 and also to reduce the friction on the straps or chains.

Having thus described my invention, what I claim is—

1. In a wire-tightener, the combination with a casing, of a screw endwise immovable, journaled therein, a nut movable on the screw, staples fixed in the nut, straps attached to said staples, and clamps attached to the free ends of said straps and constructed to grasp a fence-strand at two points, for the purpose specified.

2. The combination with a wire-tightener, of a clamp for grasping the end of the wire to be tightened, said clamp comprising a body portion provided with a fixed jaw having a roughened edge, a movable jaw having a roughened edge slidable longitudinally on the body portion toward and from the fixed jaw, a screw rotatably arranged in a threaded bearing on the body portion and connected with the movable jaw for moving the latter toward and from the fixed jaw, and a connection between the wire-tightener and said clamp, substantially as specified.

3. In a wire-tightener, the combination with a casing closed at one end thereof, of a screw having an unthreaded end, journaled in the closed end of the casing, a bearing in the other end of the casing into which the opposite unthreaded end of the screw is journaled, said bearing comprising a perforated plate provided at its opposite ends with extensions fitted in slots formed in the top and bottom of the casing and provided on its opposite edges with rounded flanges, means for preventing endwise movement of the screw in its bearings, means for detaching the screw from its bearings, a rectangular nut movably arranged in the screw and held against rotation by the sides of the casing, staples fixed in the nut, and straps attached to the staples and provided at their free ends with means for attachment to the wires to be tightened, substantially as specified.

In testimony whereof I have hereunto set my hand in presence of two subscribing witnesses.

BUSH HENRY.

Witnesses:
T. B. DRINKARD,
D. F. EPPES.